(12) United States Patent
Brown et al.

(10) Patent No.: US 11,345,133 B2
(45) Date of Patent: May 31, 2022

(54) PRINTABLE CLING-TYPE DOCUMENT

(71) Applicant: ACCELERATED PRODUCTIONS, INC., Smithfield, VA (US)

(72) Inventors: Benjamin L. Brown, Carrollton, VA (US); Joel Tawes, Midlothian, VA (US); Joshua Tawes, Smithfield, VA (US); Ray Sun, Plano, TX (US)

(73) Assignee: ACCELERATED PRODUCTIONS, INC., Smithfield, VA (US)

( * ) Notice: Subject to any disclaimer, the term of this patent is extended or adjusted under 35 U.S.C. 154(b) by 0 days.

(21) Appl. No.: 17/160,116

(22) Filed: Jan. 27, 2021

(65) Prior Publication Data
US 2021/0229411 A1 Jul. 29, 2021

Related U.S. Application Data

(60) Provisional application No. 63/040,969, filed on Jun. 18, 2020, provisional application No. 62/967,010, filed on Jan. 28, 2020.

(51) Int. Cl.
| | |
|---|---|
| *B32B 3/10* | (2006.01) |
| *B32B 29/06* | (2006.01) |
| *B32B 29/00* | (2006.01) |
| *B32B 27/36* | (2006.01) |
| *B32B 27/32* | (2006.01) |
| *B32B 27/30* | (2006.01) |
| *B32B 7/025* | (2019.01) |
| *B32B 7/12* | (2006.01) |

(52) U.S. Cl.
CPC ............. *B32B 29/06* (2013.01); *B32B 7/025* (2019.01); *B32B 7/12* (2013.01); *B32B 27/302* (2013.01); *B32B 27/306* (2013.01); *B32B 27/32* (2013.01); *B32B 27/36* (2013.01); *B32B 29/002* (2013.01); *B32B 2255/12* (2013.01); *B32B 2255/20* (2013.01); *B32B 2255/26* (2013.01); *B32B 2307/20* (2013.01); *B32B 2307/75* (2013.01); *B32B 2519/00* (2013.01)

(58) Field of Classification Search
None
See application file for complete search history.

(56) References Cited

U.S. PATENT DOCUMENTS 5,225,260 A * 7/1993 McNaul ................. G09F 15/02
40/589
2005/0271864 A1* 12/2005 van Driesten ............ G09F 3/10
428/195.1

FOREIGN PATENT DOCUMENTS

CN 202225509 U * 5/2012
CN 106047213 A * 10/2016

OTHER PUBLICATIONS

Machine translation of CN 106047213A (Year: 2016).*
Machine translation of CN202225509U (Year: 2012).*
(Continued)

*Primary Examiner* — Christopher M Polley
(74) *Attorney, Agent, or Firm* — Patent Law of Virginia, PLLC; Brian J. Teague

(57) ABSTRACT

A printable cling-type document comprises a planar paper layer having a front side and a rear side, a planar cling layer having a front side and a rear side, and a planar backing layer having a front side and a rear side. The front side of the cling layer is affixed to the rear side of the paper layer. The front side of the backing layer is adhered to and selectively removable from the rear side of the cling layer.

15 Claims, 2 Drawing Sheets

FRONT EXPLODED VIEW

(56) References Cited

OTHER PUBLICATIONS

Data sheet for REVLAR Premium Synthetic Paper, 2 pages, undated, available at https://store.relyco.com/premium-revlar.html#152=55&153=76&231=299&, last accessed Jan. 27, 2021.

* cited by examiner

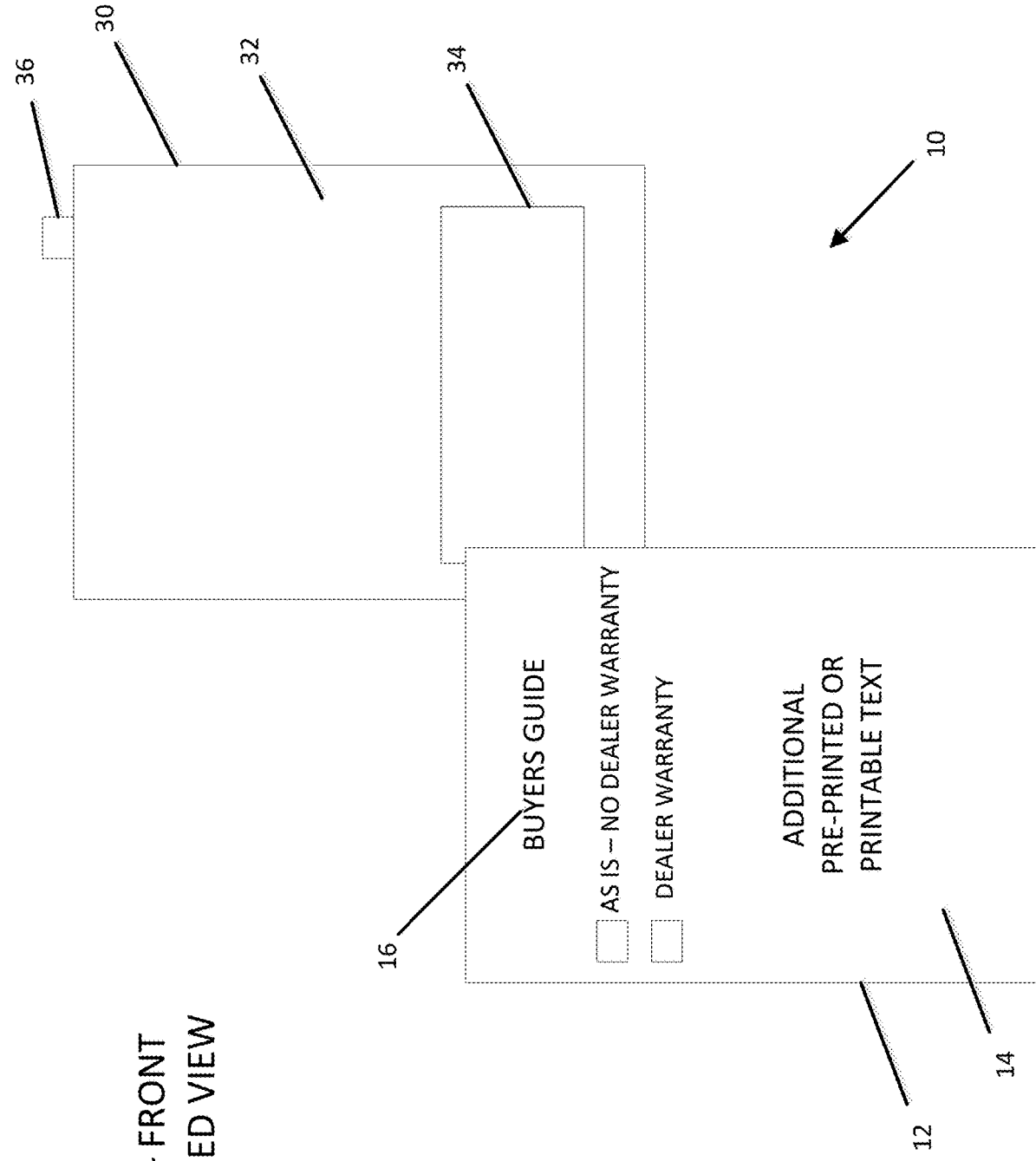
FIG 1 – FRONT EXPLODED VIEW

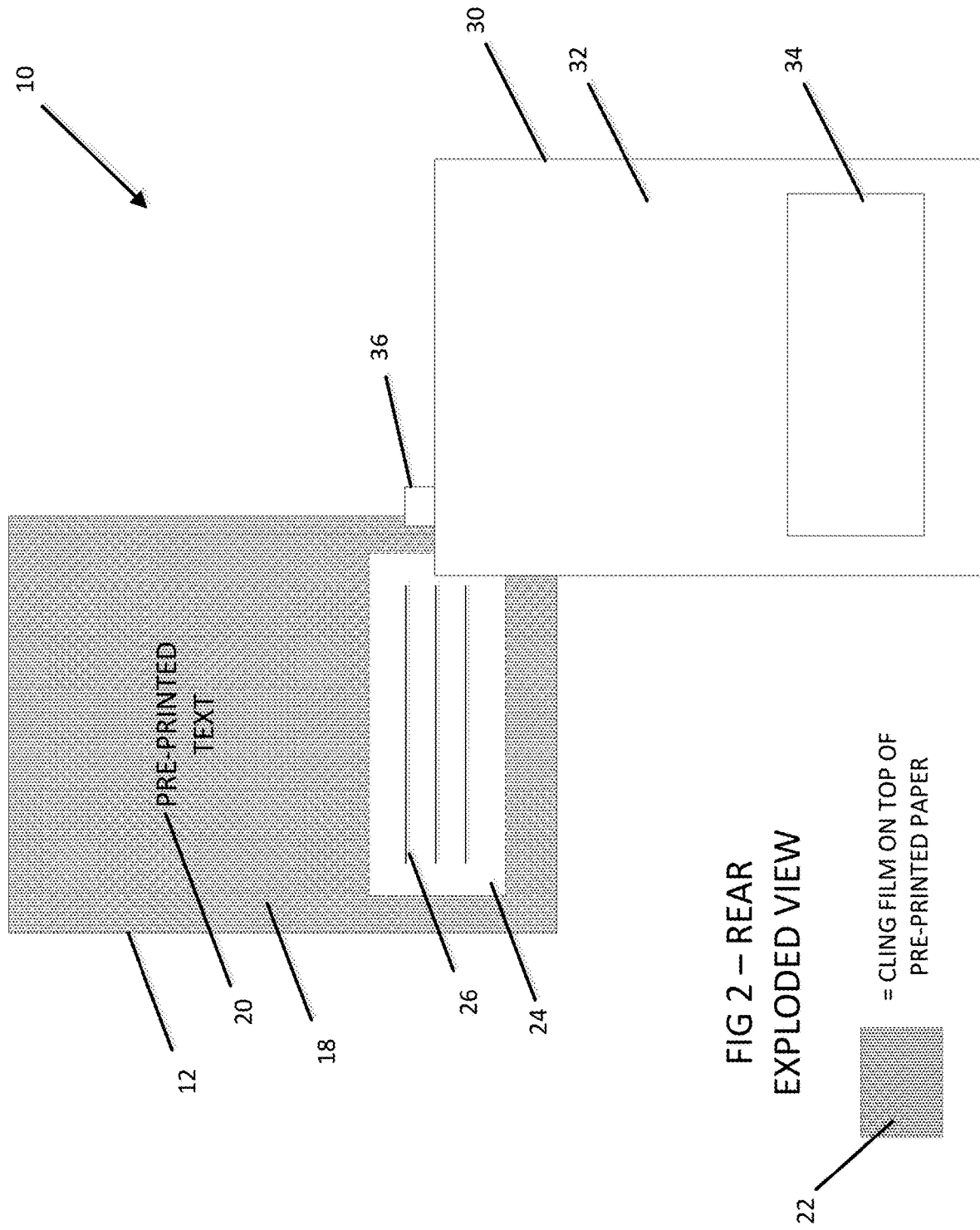

PRINTABLE CLING-TYPE DOCUMENT

CROSS-REFERENCE TO RELATED APPLICATIONS

This application claims priority to U.S. Provisional Application Ser. No. 62/967,010, filed Jan. 28, 2020 and claims priority to U.S. Provisional Application Ser. No. 63/040,969, filed Jun. 18, 2020, the contents of which are incorporated herein by reference in their entirety.

FIELD OF THE INVENTION

The present invention relates generally to documents.

BACKGROUND

Car dealers are required by federal and state law to display informational labels prominently on new and used vehicles offered for sale. Such labels include Monroney labels, used car buyers guides, vehicle addendum labels, and the like. Such labels are typically printed on plain paper stickers that are affixed to one of a vehicle's door windows. Such labels are typically placed on the inside of the window for protection from the weather (wind, rain, etc.).

Conventional used car buyers guides are double-sided. Each side contains a mix of text/information that is fixed and unchanging and text/information that may vary depending on the seller, type of vehicle, etc. A template is available to enable a used car seller to input the variable text/information and print out a compliant buyers guide. However, such a buyers guide printed from a template by a seller requires the seller to determine a suitable and resilient way to secure the guide to the vehicle window.

BRIEF SUMMARY OF THE DISCLOSURE

A printable cling-type document comprises a planar paper layer having a front side and a rear side, a planar cling layer having a front side and a rear side, and a planar backing layer having a front side and a rear side. The front side of the cling layer is affixed to the rear side of the paper layer. The front side of the backing layer is adhered to and selectively removable from the rear side of the cling layer.

The paper layer may comprise a synthetic paper layer. The synthetic paper layer may comprise a polyethylene terephthalate (PET)/polypropylene (PP) film. The PET/PP film may comprise 85-95% PET and 5-15% PP.

Information may be preprinted on the rear side of the paper layer prior to the cling layer being affixed to the paper layer.

A coating may be applied to the front side of the paper layer such that the front side of the paper layer is adapted to be printed upon by an ink jet printer. The coating may comprise ethylene-vinyl acetate and silicon dioxide.

The cling layer may comprise a polyethylene (PE) layer and a static layer. The PE layer may comprise an electronic grade PE film.

The static layer may comprise styrene ethylene butylene styrene. Alternatively, the static layer may comprise a static liquid and a silicone glue. The static layer may comprise 85-95% static liquid and 5-15% silicone glue.

The cling layer may further comprise an adhesive layer on an opposite side of the PE layer from the static layer. The adhesive layer of the cling layer may comprise a double-sided adhesive. The double-sided adhesive may comprise a PET film layer having an acrylic glue applied on opposite sides.

The backing layer may comprise a PE film layer affixed to a paper layer. A silicone oil may be applied to the PE film layer of the backing layer on a side opposite the paper layer such that the silicone oil forms the front side of the backing layer and contacts the cling layer when the backing layer is adhered to the cling layer.

A slit may be defined in the backing layer extending from one edge of the backing layer inward.

An opening may be defined in the cling layer corresponding to a user-printable region on the rear side of the paper layer. An opening may be defined in the backing layer, the opening in the backing layer being aligned with the opening in the cling layer when the backing layer is adhered to the cling layer.

BRIEF DESCRIPTION OF THE SEVERAL VIEWS OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings:

FIGS. 1 and 2 are, respectively, front and rear exploded perspective views of a printable cling-type document for creating a compliant and readily mountable buyers guide, in accordance with embodiments of the present invention.

DETAILED DESCRIPTION OF THE DISCLOSURE

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention are directed to a printable cling-type document, such as may be used for an automobile buyers guide. The document comprises a plurality of layers, as described in detail below. At a minimum, the document comprises a (typically synthetic) paper layer with a cling layer affixed thereto and a backing layer to protect the cling layer. The paper layer may have preprinted information thereupon, but importantly may be written and/or printed upon by a user. The cling layer enables a user to adhere the document to any suitable surface, in particular a window of an automobile. More specifically, embodiments of the invention are also directed to a buyers guide document that may include pre-printed information, may be printed upon using a conventional laser or inkjet printer, may be written upon with a conventional ink pen or marker, and may be adhered to a vehicle window via a cling surface.

The buyers guide document 10 of embodiments of the invention comprises a front pre-printed and/or printable/writable sheet 12 and a rear protective backing sheet 30. The front sheet 12 has a front side 14 and a rear side 18. The front side 14 of the front sheet 12 contains vehicle disclosure information 16 (text, checkboxes, etc.) that is mandated to appear on the front side of a buyers guide. The front side disclosure information 16 may include a mix of information that is pre-printed by the document manufacturer and information that is printed or written on the document by the vehicle seller. Alternatively, the document may be provided by the manufacturer with the front side 14 blank, such that the front side disclosure information 16 may be printed and/or written on the front side 14 by the vehicle seller. As the front side disclosure information 16 must include vehicle- and/or dealer-specific information, the front side disclosure information 16 cannot be entirely pre-printed, but rather must at least be partially printed/written by the vehicle seller. In other words, the buyers guide document 10 comes from the manufacturer with either the front side 14 blank (such that a vehicle seller may print or write all of the required information on the front side) or with the front side 14 having some pre-printed disclosure information with one or more lines and/or blank spaces (such that a vehicle seller may print or some of the required information (i.e., the vehicle- and/or dealer-specific information) on the front side).

The rear side 18 of the front sheet 12 contains vehicle disclosure information 20 (typically text only) that is mandated to appear on the upper portion of the rear side of a buyers guide. The upper portion rear side disclosure information 20 is pre-printed by the document manufacturer. The upper portion rear side disclosure information 20 information is able to be pre-printed because this information does not vary (i.e., it does not include vehicle- and/or dealer-specific information). The upper portion rear side disclosure information 20 must be pre-printed by the manufacturer because a clear PE (polyethylene) cling film 22 is applied by the manufacturer to the rear side 18 over the pre-printed upper portion rear side disclosure information 20. It would not be possible (or at least is undesirable) to print the information on top of the cling film 22. The cling film 22 enables the front sheet 12 to be removably adhered to a vehicle window (after the rear protective backing sheet 30 is removed).

The rear side 18 of the front sheet 12 further contains vehicle disclosure information 26 (typically only dealer-specific information) that is mandated to appear on the lower portion of the rear side 18 of a buyers guide. Because this dealer-specific lower portion rear side disclosure information 26 must be printed and/or written on the rear side 18 by the vehicle seller (i.e., added after the document 10 is manufactured), the cling film 22 must be omitted from the portion of the rear side 18 upon which the dealer-specific lower portion rear side disclosure information 26 is to be printed/written. Thus, an opening 24 is (optionally) defined in the cling film 22, with the opening 24 corresponding to the portion of the rear side 18 upon which the dealer-specific lower portion rear side disclosure information 26 is to be printed/written.

The lower portion rear side disclosure information 26 may include a mix of information that is pre-printed by the document manufacturer and information that is printed or written on the document by the vehicle seller. For example, the document manufacturer may print blank lines with a description underneath indicating what dealer-specific information should be printed/written on each blank line (e.g., dealer name, address, telephone number, etc.). Alternatively, the space for the lower portion rear side disclosure information 26 may be left completely blank by the manufacturer.

In either case, the dealer-specific lower portion rear side disclosure information 26 may be printed or written by the vehicle seller or may be applied using a stamp.

The front sheet 12 typically comprises a synthetic paper material with (optionally, but preferably) an additive to enable the front sheet 12 to be printed upon using a conventional laser or inkjet printer, or written upon with a conventional ink pen or marker.

The buyers guide document 10 of embodiments of the invention further comprises a protective peel-off backing 30. The protective backing 30 comprises a main body 32 having substantially the same size and shape as the front sheet 12, an opening 34 having substantially the same size and shape as the opening 24 (optionally) defined in the cling film 22, and an outwardly projecting tab 36 to enable a user to readily grasp the protective backing 30 for separation from the front sheet 12. After the manufacturer has printed the front side 14 (if applicable) and the rear side 18 (if applicable) of the front sheet 12 and applied the cling film 22, the manufacturer will apply the protective backing 30 to the rear side 18, taking care to align the opening 34 of the protective backing 30 with the opening 24 defined in the cling film 22. Instead of the outwardly projecting tab 36, a small slit (not illustrated) may be defined in the protective backing 30 to enable easy separation of the protective backing 30 from the front sheet 12.

The buyers guide document 10 of embodiments of the invention may be constructed in any desired size or shape.

The buyers guide document 10 of embodiments of the invention can be fed through a conventional laser or inkjet printer to print on the front and/or rear sides of the front sheet 12 (while the protective backing 30 is in place). After the required information has been printed, written, or stamped on the front sheet 12, the protective backing 30 is removed and the front sheet 12 may be adhered to a vehicle window.

As described above, the printable cling-type document of embodiments of the invention comprises three main layers: a paper layer (preferably synthetic), a cling layer, and a protective backing layer (which may also be termed a release liner). In one specific embodiment of the invention, the three layers comprise a total of eleven sub-layers as described in detail below. The specific materials and methods selected to provide the herein described three layers and eleven sub-layers provide important features and characteristics that enable the printable cling-type document of embodiments of the invention to be used as a buyers guide or the like. The document is adhesive-free, waterproof, provides high and low temperature resistance, high viscosity, and high adsorption after tearing from the surface of an object.

In one specific embodiment of the invention, the paper layer comprises a base layer of paper (preferably synthetic). The base layer typically comprises a film of polyethylene terephthalate (PET) and polypropylene (PP). The PET/PP base layer typically has a thickness of about 75 μm, although this thickness may vary as needed. The PET/PP film typically comprises 85-95% PET and 5-15% PP, and in a preferred embodiment is about 90% PET and 10% PP. The PET/PP base layer is preferably white in color.

To create the film PET/PP, PP is added into PET raw material particles and then processed into a film. The purpose of adding PP is to make the material softer for the same thickness, achieve better printing effect at high temperature, and better bonding between the coating (described below) and the base layer. After the PET and PP are processed into a film, the surface of the film is roughened by corona treatment. The purpose of the corona treatment is to change its surface energy and make it easy to bond with printing ink, coating material, and adhesive. After corona treatment, our PET/PP composite material has better adhesion characteristics, which makes the coating and here better to the base layer.

In alternative embodiments of the invention, other base layer papers (both synthetic and non-synthetic) may be used if they meet the desired requirements, such as the ability to use many different printing techniques, high temperature resistance, low temperature resistance, and/or waterproof. In addition to synthetic paper, the base layer paper may comprise art paper, photographic paper, or other paper that meet the required functionality. In alternative embodiments of the invention, the PET/PP composite film can be replaced by film made with a variety of different plastics or combinations of plastics, including but not limited to PP alone, high density polyethylene (HDPE), polystyrene, polyvinyl chloride (PVC), acrylonitrile butadiene styrene (ABS), etc. Alternative embodiments may use a PP/PET/PE composite film.

The paper layer preferably comprises a coating on the front side of the PET/PP paper layer. The coating typically has a thickness of about 35 μm, although this thickness may vary as needed. The composition of the coating is selected to enable printing or writing on the front side of the paper layer using a variety of different printing techniques, such as laser, inkjet, needle, UV, ink pen, and marker, and also ensure its stable waterproof and temperature resistance when encountering high temperature, low temperature, and high humidity, without the phenomenon of fuzzy text and failing coating. In one embodiment of the invention, the coating comprises ethylene-vinyl acetate (EVA) copolymer and silicon dioxide (e.g., CAS number 14808-60-7). In one embodiment of the invention, EVA accounts for 55-65% and silicon dioxide accounts for about 35-45% of the coating. In a more specific embodiment of the invention, EVA accounts for about 60-61% of the coating and silicon dioxide accounts for about 39-40% of the coating. EVA is used as a matrix resin and silicon dioxide as a filler. The coating density is inversely proportional to the ink absorption, and may vary as desired. The coating is applied to the PET/PP paper layer using surface treatment coating equipment.

After the coating (if any) is applied, any preprinted information may be applied to the front side of the paper layer. However in many cases, the front side of the paper layer may be left blank for the user. Preprinted information may be applied to the rear side of the paper layer prior to the cling layer being affixed to the paper layer.

In one specific embodiment of the invention, the cling layer comprises a double-sided adhesive, a base layer, and a static layer. This layer realizes the functions of high static adsorption, free of adhesive, high temperature resistance, and low temperature resistance. A conventional static cling sheet may be used for the cling layer, although various aspects may be customized as desired. The adhesive layer typically comprises a double-sided adhesive, the double-sided adhesive comprising a base layer sandwiched between adhesive layers. The adhesive layer is used to affix the cling layer to the paper layer. In one specific embodiment of the invention, the adhesive layer of the double-sided adhesive is a PET film, with a thickness of about 4.5 μm (although the thickness may vary). The adhesive that sandwiches the PET film in the double-sided adhesive may comprise an acrylic glue. The acrylic glue layer that is adjacent the paper layer is typically about 5.5 μm thick, while the adhesive layer that is adjacent the base layer of the cling layer is about 5 μm thick (although these thicknesses may vary). Acrylic glue is a transparent solvent adhesive, which has the advantages of room temperature curing, fast curing speed, no bubbles, convenient use, quick positioning, high bonding strength, etc. The double-sided adhesive is similar to 3M product #9832HL, but with different thicknesses.

In one specific embodiment, the base layer of the cling layer comprises a PE film. The PE film has a thickness of about 60 μm, although this thickness may vary. The PE film is preferably electronic grade, for its superior characteristics. Electronic grade PE film can also be called optical grade PE film. Compared with PE film used in the hardware industry, optical grade PE film has stronger functionality, fewer impurities, high cleanliness, and no recycled materials. There are other choices of base layer material for common static film, but in order to meet the various demands of our products, the performance of PE film is the most suitable at present. The base layer of the cling layer is affixed to the rear side of the paper layer via the adhesive layer.

There are at least two different options for the static layer in embodiments of the invention. In one option the static layer comprises Styrene Ethylene Butylene Styrene Copolymer (SEBS). The SEBS his sprayed onto the PE film through a high-precision process and multiple casting machine, thus producing the finished product at one time. The process makes it have high-strength static adsorption and sticking function without residual glue. In a second option, the static layer comprises a static liquid and a silicone glue. In one specific embodiment, the static layer comprises 85-95% static liquid and 5-15% silicone glue (and preferably about 90% static liquid and about 10% silicone glue). The operation process is to mix static liquid with silicone glue at the desired proportion, and then spray the mixture onto PE. The comprehensive process makes it have high-strength static adsorption and sticking function without residual glue. The proportion of static liquid and silicone glue can be adjusted as needed. The static liquid is an ethylene vinyl acetate (EVA) material, which has an adsorption function. A silicone glue is added to the static liquid in order to make the product have higher adsorption and sticking effect. However, too much silicone glue may make the whole product lose its adsorption effect.

The backing layer or release liner, which is conventionally known, has four layers: silicone oil, PE film, acrylic glue and (preferably white) base paper. This layer protects the cling layer prior to actual use of product, and is the discarded part in actual use. The silicone oil is applied to the PE film layer of the backing layer on a side opposite the paper layer such that the silicone oil forms the front side of the backing layer and contacts the cling layer when the backing layer is adhered to the cling layer. The acrylic glue fixes the base paper to the PE film. There is preferably a 1" die cut in the middle of the bottom of the back of the release liner for the convenience of peeling back paper. In one embodiment of the invention, the total thickness of the backing layer is about 90 μm. Specifically, the silicone oil and PE film is together about 25 μm thick, and the acrylic glue and white base paper is together about 65 μm thick. The white base paper is preferably whole wood, high-grade pulp base paper, having high flatness, dense and uniform texture, and good internal strength. Other suitable materials may be used for any and all of the sub-layers of the backing layer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A printable cling-type document comprising:
   a planar paper layer having a front side and a rear side;
   a planar cling layer having a front side and a rear side, the front side of the cling layer being affixed to the rear side of the paper layer; and
   a planar backing layer having a front side and a rear side, the front side of the backing layer being adhered to and selectively removable from the rear side of the cling layer;
   wherein the cling layer comprises a polyethylene (PE) layer and a static layer; and
   wherein the static layer comprises styrene ethylene butylene styrene.

2. The document of claim 1, wherein the paper layer comprises a synthetic paper layer.

3. The document of claim 2, wherein the synthetic paper layer comprises a polyethylene terephthalate (PET)/polypropylene (PP) film.

4. The document of claim 3, wherein the PET/PP film comprises 85-95% PET and 5-15% PP.

5. The document of claim 1, wherein information is preprinted on the rear side of the paper layer prior to the cling layer being affixed to the paper layer.

6. The document of claim 1, wherein a coating is applied to the front side of the paper layer such that the front side of the paper layer is adapted to be printed upon by an ink jet printer.

7. The document of claim 6, wherein the coating comprises ethylene-vinyl acetate and silicon dioxide.

8. The document of claim 1, wherein the PE layer comprises an electronic grade PE film.

9. The document of claim 1, wherein the cling layer further comprises an adhesive layer on an opposite side of the PE layer from the static layer.

10. The document of claim 9, wherein the adhesive layer of the cling layer comprises a double-sided adhesive.

11. The document of claim 10, wherein the double-sided adhesive comprises a PET film layer having an acrylic glue applied on opposite sides.

12. The document of claim 1, wherein the backing layer comprises a PE film layer affixed to a paper layer; and
   wherein a silicone oil is applied to the PE film layer of the backing layer on a side opposite the paper layer such that the silicone oil forms the front side of the backing layer and contacts the cling layer when the backing layer is adhered to the cling layer.

13. The document of claim 1, wherein a slit is defined in the backing layer extending from one edge of the backing layer inward.

14. The document of claim 1, wherein an opening is defined in the cling layer corresponding to a user-printable region on the rear side of the paper layer.

15. The document of claim 13, wherein an opening is defined in the backing layer, the opening in the backing layer being aligned with the opening in the cling layer when the backing layer is adhered to the cling layer.

* * * * *